United States Patent [19]

Brahmbhatt et al.

[11] Patent Number: 4,931,013

[45] Date of Patent: Jun. 5, 1990

[54] HIGH-TEMPERATURE BURNER

[75] Inventors: Sudhir R. Brahmbhatt, Macungie, Pa.; Christopher R. Young, San Antonio, Tex.

[73] Assignee: MG Industries, Valley Forge, Pa.

[21] Appl. No.: 375,953

[22] Filed: Jul. 6, 1989

[51] Int. Cl.⁵ .......................... F23C 7/00; C21C 7/00
[52] U.S. Cl. ..................................... 431/10; 431/187; 266/225; 266/268; 266/44; 266/47
[58] Field of Search ................. 266/225, 268, 901, 44, 266/47; 431/10, 187, 188

[56] References Cited

U.S. PATENT DOCUMENTS

| | | |
|---|---|---|
| 3,733,165 | 5/1973 | Nakagawa . |
| 3,889,933 | 6/1975 | Jaquay ................................. 266/44 |
| 3,890,084 | 6/1975 | Voorheis . |
| 3,935,824 | 2/1976 | Gibeault . |
| 4,287,857 | 9/1981 | Schnitzer . |
| 4,343,605 | 8/1982 | Browning . |
| 4,378,205 | 3/1983 | Anderson . |
| 4,473,350 | 9/1984 | Gitman . |
| 4,509,915 | 4/1985 | Ito . |
| 4,541,796 | 9/1985 | Anderson . |
| 4,551,090 | 11/1985 | Leikert . |
| 4,575,394 | 3/1986 | Nixon .................................. 266/44 |
| 4,708,637 | 11/1987 | Dutescu . |
| 4,761,132 | 8/1988 | Khinkis . |
| 4,797,087 | 1/1989 | Gitman ................................. 431/187 |

Primary Examiner—Carroll B. Dority
Attorney, Agent, or Firm—William H. Eilberg

[57] ABSTRACT

This invention concerns the burning of fuels, such as natural gas, at high temperatures. The invention includes a high-efficiency burner which achieves substantially complete combusiton at modest cost. The burner of the present invention includes a generally cylindrical housing having a central bore and two concentric annular regions. A lance is inserted through the central bore, and protrudes slightly from the front face of the burner housing. The fuel is directed through the inner annular region, and oxygen-enriched combustion air is directed through the outer annular region. Substantially pure oxygen is directed through the lance. The gases in the lance and the annular regions do not communicate with each other within the burner housing, and all burnign takes place outside the housing. The same supply of oxygen can be used to supply the lance and to enrich the combustion air. The present invention achieves overall results which are substantially comparable to the results obtained from pure oxygen burners, but at a greatly reduced equipment cost, and with reduced operating cost.

13 Claims, 2 Drawing Sheets

HIGH-TEMPERATURE BURNER

BACKGROUND OF THE INVENTION

This invention relates to a burner for use in high-temperature industrial applications, and also includes a method for efficient burning of fuels at high temperatures.

Many industrial processes require burners capable of heating a furnace to a high temperature, above about 2000° F. For example, it is known to melt scrap metal in order to recover pure lead for use in making batteries. The furnace needs to be kept at about 2000° F., while the metal itself may be heated to 1200° F. or more. Maintaining the furnace at these temperatures requires a burner having a flame temperature which is even higher, of the order of 3400° F.

The invention is not limited to use in any one particular application; it can be used in many other high-temperature environments, especially where it is desired to accelerate the rate of heating.

Due to the increased concern about air pollution, and the need to comply with laws and regulations restricting atmospheric emissions, it is important that the combustion in a high-temperature furnace be complete. The U.S. Environmental Protection Agency, and various states, have established "opacity" standards governing the amount of particulates and unburned substances that may be vented into the atmosphere. The less complete the combustion, the more opaque the vented gas will be. The opacity problem is especially acute when a burner is used to melt scrap metal. Scrap metal generally contains deposits of oil and other organic impurities, which should be burned off during the melting process, but which will not be completely combusted unless there is sufficient oxygen and unless the temperature is sufficiently high. If the latter conditions are not met, the result is a residue of carbon monoxide and various other hydrocarbons, which manifest themselves as opaque emissions. If the fuel is oil instead of natural gas, the opacity problem is even greater.

One approach towards solution of the problem of incomplete combustion, and the resulting air pollution, is to enrich the combustion air with oxygen. By increasing the proportion of oxygen to about 26%, one increases the flame temperature from about 3400° F. to about 3800-4000° F. At these higher flame temperatures, the combustion rate is increased, and the combustion tends to be more complete.

One can also increase the completeness of combustion by reducing the flow of combustion air through the burner, while maintaining or increasing its oxygen content, by using an external source of oxygen. Reducing the flow of combustion air, while supplying oxygen from an external source, will reduce the proportion of inert gas (i.e. nitrogen) in the combustion atmosphere, and therefore increases the relative activity of the oxygen in that atmosphere. The result is a higher flame temperature, more complete combustion, and increased burner efficiency. To prevent the flame temperature from increasing to a dangerous level, one can reduce the flow of fuel into the burner.

Although the above-described approaches do improve the efficiency of burning, both in reducing the time needed to perform the desired melting or other operation, and in reducing the amount of pollutants emitted, they do not solve the problem entirely. Indeed, merely increasing the oxygen level to 26% has been found not to be sufficient to comply with current opacity standards Another approach has been to use pure or substantially pure oxygen as the combustion medium. With pure oxygen, the flame temperature may be as high as 5000° F. The use of pure oxygen will achieve complete combustion, and will reduce the opacity of the combustion products sufficiently to satisfy current governmental requirements. But using pure oxygen is expensive. The stoichiometric relationships are such that a great quantity of pure oxygen would be needed to burn the desired quantity of fuel. Moreover, the capital costs associated with burning in pure oxygen are substantial. One needs a burner that can withstand the very high temperatures generated by burning in pure oxygen. Also, the furnace lining must be able to withstand the high temperatures. One also needs a special control system to avoid melting the tip of the burner. Such a system generally includes a water distribution system to cool the tip, and this system must be automatic and fully integrated with the other components.

One might also attempt to achieve complete combustion by injecting oxygen directly into the furnace. But such a procedure will lower the temperature of the furnace, and therefore is not a solution to the problem.

The present invention includes a high-temperature burner whose efficiency is substantially comparable to that of a pure oxygen burner, but which is relatively inexpensive to build and operate. Indeed, the burner of the present invention can be made by retrofitting existing equipment, so the initial cost of practicing the invention is usually very small. The use of the burner of the present invention makes it feasible to raise the flame temperature, and the oxygen content of the combustion atmosphere, to enable the contents of a furnace to be melted without polluting the air.

SUMMARY OF THE INVENTION

The burner of the present invention includes a housing of generally cylindrical shape, the housing having a central bore and two generally concentric annular regions. A conduit or "lance" is inserted through the central bore, and protrudes slightly from the front face of the housing. The fuel is injected into the inner annular region, and oxygen-enriched combustion air is injected into the outer annular region. Substantially pure oxygen is delivered into the lance. The oxygen in the lance, and the gases in the annular regions, do not communicate with each other within the burner housing. The actual burning takes place outside of the housing.

It is preferred, though not absolutely necessary, that the same source of pure oxygen be used to enrich the combustion air and to supply oxygen to the lance.

When the combustion air is enriched to a level of 26% oxygen, and the lance of pure oxygen, is used, it turns out that the effective oxygen percentage is about 35%, and the flame temperature is about 4000° F. Although the latter temperature is lower than the temperature of a pure-oxygen fuel burner, the net benefits are comparable to those achieved with pure oxygen. Moreover, the costs of building and operating the burner are substantially less than those of burners of the prior art.

It is therefore an object of the invention to provide a high-temperature burner.

It is another object to provide a burner which is nearly as efficient as a pure-oxygen burner, but which is much less expensive to build and operate.

It is another object to provide a burner which reduces fuel requirements.

It is another object to provide a burner which does not require a separate cooling system or a separate heat exchanger for the burner itself.

It is another object to provide a burner which can be made by retrofitting existing burners.

It is another object to provide a method of burning a fuel in an environmentally-safe and economically-efficient manner.

It is another object to provide a method and apparatus for heating the contents of a furnace, in a manner that does not produce unacceptably large amounts of pollutants.

It is another object to reduce the flow rate of combustion air through a high-temperature burner.

Other objects and advantages of the invention will be apparent to those skilled in the art, from a reading of the following brief description of the drawings, the detailed description of the invention, and the appended claims.

DETAILED DESCRIPTION OF THE INVENTION

The present invention is a burner which can be used for generating large amounts of heat, as required for various industrial applications. The invention also includes a method of burning a fuel.

Figure 1:
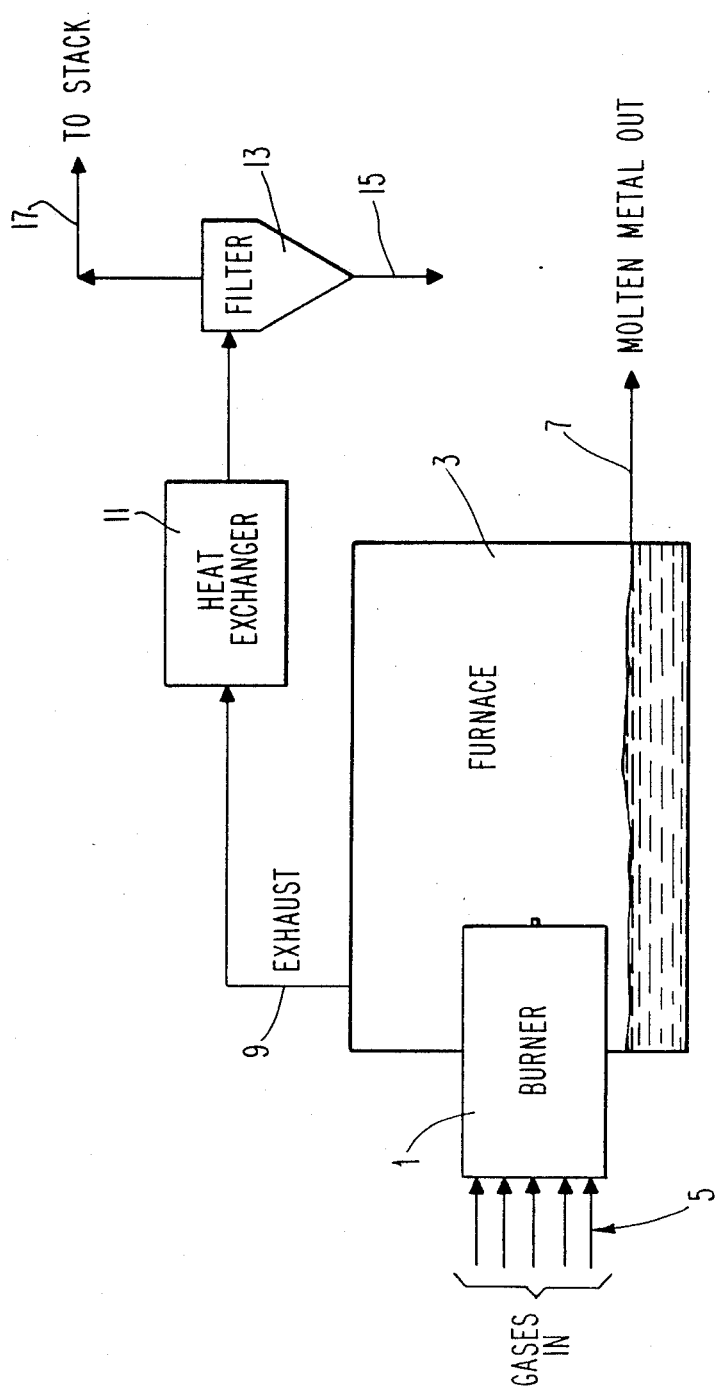
FIG. 1 is a schematic diagram showing the use of the burner of the present invention in providing heat to a furnace, for the purpose of melting metal.

One context in which the invention can be used is illustrated in the schematic diagram of FIG. 1. Burner 1 is shown inserted into furnace 3. The internal structure of the burner will be described later. Gases enter the burner through several lines, all of which are collectively designated by reference numeral 5. The furnace is assumed to contain scrap metal, and the heat generated by the burner melts the metal, which can then be withdrawn through line 7. The present invention is not limited to use in melting metal, however.

The combustion products leave the furnace through exhaust line 9, and their temperature is reduced by heat exchanger 11. The cooled combustion products pass through filter 13, which removes solid particulates entrained in the gases. The particulates leave the system through line 15, and the remaining gases vent through line 17.

Figure 2:
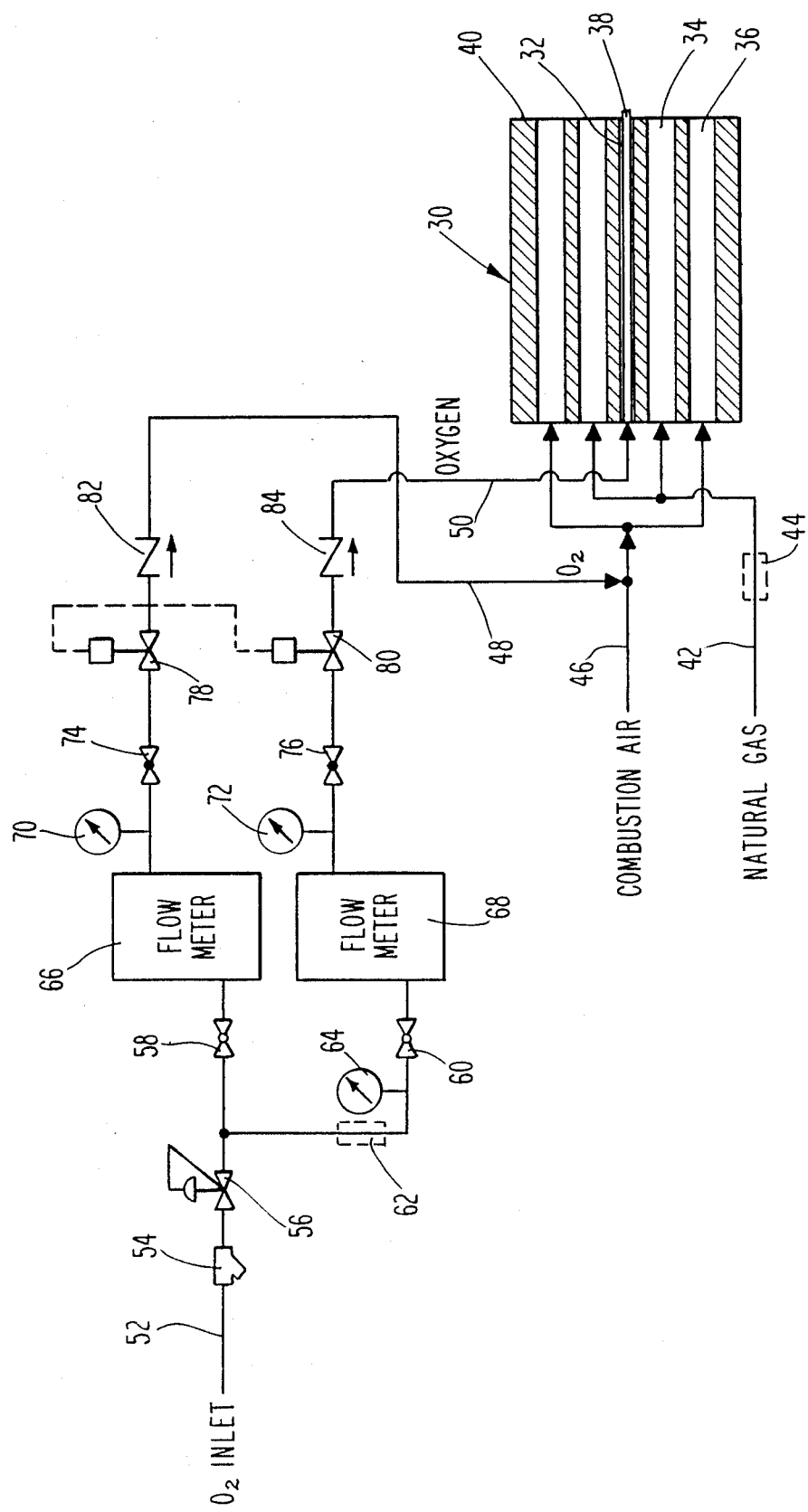
FIG. 2 is a schematic diagram showing the structure of the burner of the present invention, and also showing the system for supplying oxygen to the burner.

FIG. 2 shows the structure of the burner, and its associated oxygen supply. The burner of the present invention comprises a generally cylindrical housing 30, shown in cross-section in FIG. 2. The housing may be made of metal, or it can be made of a ceramic, or other material capable of withstanding high temperatures. The housing has a central bore 32, and two generally concentric annular regions 34 and 36. Region 34 is designated as the "inner" region, and region 36 is called the "outer" region. Lance 38, which is a conduit or pipe, is inserted within central bore 32. The lance extends through the entire housing, and protrudes slightly beyond front face 40 of the housing. The lance is connected to a supply of substantially pure oxygen, as will be described below. Preferably, the lance also protrudes somewhat from the rear face of the housing, for ease of connection to the oxygen supply, although such protrusion is not shown in FIG. 2. One purpose of the lance is to reduce the effective cross-sectional area of the central bore, so as to increase the velocity of the oxygen flowing through the lance.

A source (not shown) of fuel, preferably natural gas, is connected to conduit 42, which is connected to inner annular region 34. A flame arrester 44 is preferably included in conduit 42, to prevent the flame from traveling back towards the fuel supply.

A source (not shown) of combustion air is connected to conduit 46, which is connected to outer annular region 36. Oxygen conduits 48 and 50 deliver oxygen into conduits 46 and lance 38, respectively.

The oxygen for conduit 46 and lance 38 originates from a source (not shown), and passes through conduit 52. The oxygen in conduit 52 passes through strainer 54, which filters out particulates that may be in the oxygen, and then passes through pressure regulating valve 56. The oxygen is then separated into two streams, one of which passes through ball valve 58 and the other of which passes through ball valve 60. The ball valves are intended to be fully open or fully closed, and are operated manually. Other valve structures can be used. The conduit containing valve 60 also includes flame arrester 62 and pressure gauge 64.

Both oxygen lines pass through flow meters 66 and 68. Pressure gauges 70 and 72 are used in conjunction with the flow meters, which are accurate only at a predetermined pressure. The pressure gauges 70 and 72 are therefore used to insure the accuracy of the flow meters, by making it possible to correct the flow meter reading when the pressure changes. The oxygen lines are provided with globe valves 74 and 76, which are manually operated, and capable of restricting the flow either fully or partially. Various other valve structures can be used in place of the globe valves.

The oxygen lines also pass through solenoid valves 78 and 80, which are automatically activated by suitable control means (not shown). The solenoid valves can shut off the system in case of emergency. Check valves 82 and 84 prevent oxygen from flowing backward towards the source.

Lance 38 is essentially a pipe which reduces the effective diameter of the central bore, and prevents the front face of the burner from melting. The diameter of the lance should be sufficiently small to cause the oxygen to flow through it at approximately the speed of sound. When oxygen flows through the lance at sonic velocity, the oxygen stream tends to carry the flame away from the front face of the burner, and the combustion begins at a point somewhat removed from that front face.

In a burner whose length is about four feet, and whose central bore has a diameter of approximately 1.25 inches, the lance might extend about one inch from the front face. However, this number is not believed critical, and the invention is not intended to be limited to a particular amount of protrusion. The lance is preferably made of metal, such as Inconel, and may have a diameter of about 0.375 inches. However, the material used for the lance is not believed critical, as long as it can withstand the high temperatures present in the housing. Also the diameter of the lance can be varied.

Oxygen from the lance combines with the fuel-air mixture, outside of the burner. No combustion takes place within the burner housing, as the annular regions and the oxygen lance do not communicate with each other.

One of the advantages of the present invention is that it can be easily built by a simple modification of existing burners. The burner housing shown in FIG. 2, without the lance, is similar to so-called "dual-fuel" burners which are commercially available, such as from North American Mfg. Co., of Cleveland, Ohio, or Hauck Mfg. Co., of Lebanon, Pa., among others. A dual-fuel burner allows the operator to use either natural gas or oil, depending on which fuel is more desirable at a particular time. Combustion air is supplied through the outer annular region, and the fuel is supplied either through the inner annular region (in the case of natural gas) or the central bore (in the case of oil). The central bore is used for oil fuel because the oil is relatively heavy, and requires a smaller cross-section to achieve larger velocities. The primary difference between the burner of the present invention and the above-described dual-fuel burner is that the present invention includes the oxygen lance. Also, in the present invention, the central bore is used not to deliver fuel, but instead to deliver pure oxygen.

The method of the present invention therefore comprises the steps of directing oxygen through a lance, disposed within the core of a cylindrical housing, while simultaneously directing fuel and enriched combustion air through concentric annular regions in the housing. In many applications, such as in melting scrap metal, the flow of oxygen in the lance can be turned off after the initial melting is completed, because the hydrocarbons in the scrap metal will have been burned away.

The invention was quantitatively and qualitatively tested by operating a furnace for melting lead under the following three conditions. In Case 1, there was no added oxygen. In Case 2, there was oxygen enrichment only. In Case 3, which represents the present invention, both an oxygen lance and oxygen-enriched combustion air were used.

The burner used was Model No. NA 6795-43-12, made by North American Mfg. Co. The length of this burner is about four feet, and its central bore has a diameter of about 1.25 inches. A five-foot lance made of Inconel alloy 600, and having a diameter of about 0.375 inches, was inserted through the central bore, and held within the bore by a suitable mounting means. The lance extended about one inch from the front face of the burner housing. Thus, the lance protruded about 11 inches from the rear face of the burner. This protrusion is convenient for making the necessary connection to the oxygen source.

In all three cases, the flow rate of natural gas was 4 million BTU/hr. Also, the same weight of scrap metal was loaded into the furnace for each case.

In Case 1, the air flow rate through the burner was 60,000 SCFH (standard cubic feet per hour). The time required for a melt cycle, i.e. the time needed to melt all the scrap metal in the furnace, was about 24 hours. Moreover, the opacity of the vented gas was near 100%. The heat exchangers in the flue gas circuit were overloaded, and it was difficult to maintain the temperature in the flue gas outlet at a low level. The burner flame was long and dull, and while the molten metal was being withdrawn from the furnace, smoke was observed. Even when fuel was being burned at a rate of 4 million BTU/hr, the initial heat-up time was long, about 2-3 hours. When the furnace door was periodically opened, a large amount of smoke rushed through the door. Oxidation of lead was obvious as the molten metal was withdrawn from the furnace.

In Cases 2 and 3, the air flow rate was about half that of Case 1. Nevertheless, the melt cycle time in Case 2 was about 6 hours, and the melt cycle time in Case 3 was only 4 hours.

In Case 2, the opacity problem was less than that of Case 1, but not sufficient to satisfy governmental opacity standards. But in Case 3, the opacity was dramatically improved over Cases 1 and 2, and was at an acceptable level. Only 50% of the capacity of the flue gas heat exchanger was used, in Case 3.

In Case 3, the outlet temperature of the flue gas was maintained at a relatively low level, making available additional capacity for the heat exchanger in the outlet line, and, in contrast with Cases 1 and 2, the burner flame was hot and short, and there was no smoke observed while molten metal was withdrawn. Even when fuel was burned at a rate of 2.5 million BTU/hr, the initial heat-up time was short, of the order of 0.5–1.0 hour, and the heat was distributed uniformly throughout the furnace. Also, whenever the furnace door was opened, a very small amount of smoke rushed through the door. There were no signs of oxidation of lead when the molten metal was withdrawn.

The burner of the present invention therefore provides most of the benefits of an oxygen-fuel burner, but at far lower cost. Because the present invention can be used by making a simple modification of existing dual-fuel burners, and because it is not necessary to provide a separate cooling arrangement for the burner tip, the burner of the present invention is much less expensive to build and operate than an oxygen-fuel burner. The oxygen consumption is also less. In an oxygen-fuel burner, the oxygen consumed is about 2.1 times the volume of the fuel, whereas in the present invention, the ratio is only about 1.4. And the present invention provides sufficiently complete combustion of the furnace contents to comply with governmental emission standards.

The burner of the present invention has the additional advantage that it can be used with a comparatively reduced rate of air flow into the burner, thus reducing the need for heat exchange in the exhaust circuit, because there is a smaller mass flow than with burners of the prior art. This reduction in the flow of combustion air also enhances the activity of the oxygen, since the dilution of the combustion atmosphere is reduced, with the net effect that the combustion is more rapid and more complete. Moreover, the overall fuel requirement is reduced, with the present invention, because after the initial melting, one is rid of hydrocarbons in the scrap being melted, and one can turn off the supply of oxygen to the lance, and maintain the burner using only the oxygen-enriched combustion air.

Thus, the advantages of the present invention can be summarized briefly as follows:
1. Reduced opacity (more complete combustion)
2. Reduced flow of combustion air
3. Reduced cycle time
4. Reduced requirements for heat exchange in exhaust circuit
5. More efficient operation (higher flame temperature than in conventional burners)
6. Reduced capital investment and operating costs While the invention has been described with respect to a particular embodiment, it is understood that the invention may be varied in many ways. The particular arrangement of valves shown in FIG. 2 is only exemplary, and many other arrangements and valve components can be used. The dimensions of the lance are also not believed to be critical, and can be changed. Other burner housing configurations could be used. It is possible that the regions of the burner housing could be other than annular, and non-concentric. These and other variations are intended to be included within the spirit and scope of the following claims.

What is claimed is:

1. Apparatus for burning a fuel, comprising:
   (a) a burner comprising a generally cylindrical housing, the housing having a central longitudinal bore and two annular regions disposed around the bore and being concentric with the bore, one of the annular regions being connected to a supply of fuel, the other annular region being connected to a supply of combustion air, wherein the annular regions and the central bore do not communicate with each other within the housing, and
   (b) means for supplying two streams of substantially pure oxygen, one stream being connected to a lance inserted within the central bore, and the other stream being connected a flow line carrying the combustion air, wherein the lance extends beyond the front face of the housing.

2. The apparatus of claim 1, wherein the oxygen supply means comprises means for dividing a single stream of oxygen into two streams.

3. The apparatus of claim 1, wherein one annular region is the inner region and the other annular region is the outer region, and wherein the region connected to the supply of fuel is the inner region.

4. A burner comprising a generally cylindrical housing, the housing having a central longitudinal bore, the housing having at least two annular regions disposed around the bore and being concentric with the bore, one annular region being connected to a supply of fuel, another annular region being connected to a supply of oxygen-enriched air, the central bore having a lance disposed therein, the lance being connected to a source of substantially pure oxygen, wherein the annular regions and the central bore do not communicate with each other within the housing.

5. The burner of claim 4, wherein the housing has a front face, and wherein the lance protrudes beyond the front face of the burner.

6. A high-temperature burner comprising a generally cylindrical housing, the housing having a central longitudinal bore, the housing having an inner annular region generally concentric with the bore, and an outer annular region generally concentric with the bore, and a conduit inserted within the central bore, the housing having a front face, the conduit extending beyond the front face of the burner, one of the annular regions being connected to a source of fuel and the other of the annular regions being connected to a source of combustion air, the conduit being connected to a source of substantially pure oxygen.

7. The burner of claim 6, wherein the annular region which is connected to the source of combustion air is also connected to a source of substantially pure oxygen, such that the air flowing through said annular region is oxygen-enriched.

8. In a fuel burner, the burner having a generally cylindrical housing, the housing having a central bore and two concentric annular regions, the housing having a front face, the central bore and the annular regions being separate and non-communicating, the improvement comprising a conduit inserted into the central bore and extending beyond the front face of the housing, the conduit being connected to a source of substantially pure oxygen, wherein one annular region is connected to a source of fuel, and wherein another annular region is connected to a source of oxygen-enriched combustion air.

9. A method of using a dual-fuel burner to burn a fuel, the burner comprising a generally cylindrical housing, the housing having a central bore and two concentric annular regions, the housing having a front face, the method comprising the steps of providing a conduit into the central bore, such that the conduit protrudes beyond the front face of the housing, and directing substantially pure oxygen through the conduit, while directing a fuel through one of the annular regions, and while directing oxygen-enriched air through the other of the annular regions.

10. A method of burning a fuel, comprising the steps of:
   (a) providing separate sources of substantially pure oxygen, combustion air, and fuel,
   (b) forming first and second streams of oxygen from said oxygen source,
   (c) directing oxygen from the first stream into a first conduit disposed within a burner, while simultaneously mixing oxygen from the second stream with combustion air and directing the resulting mixture into a second conduit within the burner, while simultaneously directing fuel into a third conduit within the burner, wherein the oxygen, the fuel, and the oxygen-enriched air are directed into separate and non-communicating channels within the burner, such that all burning takes place outside the burner.

11. The method of claim 10, wherein the burner has a housing, the housing having a front face, wherein the first conduit comprises a lance inserted within a central bore of the housing, wherein the lance extends beyond the front face of the housing, and wherein the burning takes place outside the housing and away from the front face.

12. The method of claim 11, wherein the second and third conduits comprise generally concentric annular regions in the housing, the annular regions being formed around the central bore.

13. A method of melting scrap metal, comprising the steps of:
   (a) providing separate sources of substantially pure oxygen, combustion air, and fuel,
   (b) forming first and second streams of oxygen from said oxygen source,
   (c) directing oxygen from the first stream into a first conduit disposed within a burner, the burner being disposed within a furnace containing the metal to be melted, mixing oxygen from the second stream with combustion air and directing the resulting mixture into a second conduit within the burner, simultaneously with the oxygen-directing step, directing fuel into a third conduit within the burner simultaneously with the oxygen-directing step, wherein the oxygen, the fuel, and the oxygen-enriched air are directed into separate and non-communicating channels within the burner, such that all burning takes place outside the burner,
   (d) determining when the metal being melted is substantially free of hydrocarbons, and
   (e) stopping the flow of oxygen in the first stream when the metal is substantially free of hydrocarbons, while maintaining the flow of fuel and enriched combustion air through the burner.

* * * * *